United States Patent
Akiona et al.

(10) Patent No.: US 12,236,222 B2
(45) Date of Patent: Feb. 25, 2025

(54) SCALABLE, ROBUST, AND SECURE MULTI-TENANT EDGE ARCHITECTURE FOR MISSION-CRITICAL APPLICATIONS

(71) Applicant: Accenture Global Solutions Limited, Dublin (IE)

(72) Inventors: Nicholas Akiona, Saratoga, CA (US); Matthew Lee Austin, Waukesha, WI (US); Andrew Nam, San Francisco, CA (US)

(73) Assignee: Accenture Global Solutions Limited, Dublin (IE)

( * ) Notice: Subject to any disclaimer, the term of this patent is extended or adjusted under 35 U.S.C. 154(b) by 0 days.

(21) Appl. No.: 17/328,934

(22) Filed: May 24, 2021

(65) Prior Publication Data

US 2022/0206772 A1 Jun. 30, 2022

Related U.S. Application Data (60) Provisional application No. 63/132,373, filed on Dec. 30, 2020.

(51) Int. Cl.
*G06F 8/60* (2018.01)
*H04L 9/40* (2022.01)
*H04L 47/12* (2022.01)

(52) U.S. Cl.
CPC ............... *G06F 8/60* (2013.01); *H04L 47/12* (2013.01); *H04L 63/10* (2013.01); *H04L 63/18* (2013.01)

(58) Field of Classification Search
CPC . G06F 8/60; H04L 47/12; H04L 63/10; H04L 63/18
See application file for complete search history.

(56) References Cited

U.S. PATENT DOCUMENTS 11,178,182 B2 * 11/2021 Saxena .................. H04L 63/10
11,190,579 B1 * 11/2021 Barton ................... H04L 43/08
(Continued)

FOREIGN PATENT DOCUMENTS

| CN | 110098947 A | * | 8/2019 | ......... H04L 41/5041 |
| CN | 110737442 A | * | 1/2020 | ............... G06F 8/60 |

(Continued)

OTHER PUBLICATIONS

Chen et al., "Deploying Data-intensive Applications with Multiple Services Components on Edge", Apr. 2020, Springer (Year: 2020).*
(Continued)

*Primary Examiner* — Wei Y Zhen
*Assistant Examiner* — Junchun Wu (57) ABSTRACT

Aspects of the present disclosure provide systems, methods, and computer-readable storage media that support cross-server containerized application allocation, multi-tenant namespace management, and data layer deployment in an edge environment. To illustrate, containers associated with an application are deployed to edge servers based on a geographic characteristic of the edge server with respect to an edge device receiving services from the application. A common data layer is provided across the edge environment to manage communications between the different containers, and between the application and other applications of the edge environment. Managing the communication is based on namespaces and/or a modality (e.g., private or public) associated with the application. Authentication configuration of the application is used to determine edge resource access for the containers of the application. A common orchestration layer is provided across the edge environment to manage scaling and configuration updates of the application.

18 Claims, 6 Drawing Sheets

(56) References Cited

U.S. PATENT DOCUMENTS

| | | | | |
|---|---|---|---|---|
| 11,316,757 | B1* | 4/2022 | Eliav | G06F 8/60 |
| 11,689,638 | B2* | 6/2023 | Du | G06F 9/4881 |
| | | | | 709/226 |
| 2016/0036921 | A1* | 2/2016 | Sama | H04L 67/141 |
| | | | | 709/228 |
| 2018/0324204 | A1* | 11/2018 | McClory | G06F 9/5027 |
| 2019/0272179 | A1* | 9/2019 | McMullen | G06F 8/41 |
| 2019/0391798 | A1* | 12/2019 | Farrell | G06F 11/3672 |
| 2020/0344293 | A1* | 10/2020 | Wolter | G06F 8/60 |
| 2020/0387129 | A1* | 12/2020 | Chandaria | G05B 19/058 |
| 2021/0044646 | A1* | 2/2021 | Guim Bernat | H04L 67/5682 |
| 2021/0144517 | A1* | 5/2021 | Guim Bernat | H04L 9/3247 |
| 2021/0240459 | A1* | 8/2021 | Ranjan | G06F 9/5055 |
| 2022/0034670 | A1* | 2/2022 | Wang | G06F 8/60 |
| 2022/0060523 | A1* | 2/2022 | Brevoort | G06Q 50/40 |
| 2022/0179398 | A1* | 6/2022 | Putman | G06F 8/60 |

FOREIGN PATENT DOCUMENTS

| | | | | | |
|---|---|---|---|---|---|
| CN | 111683125 | A | * | 9/2020 | H04L 41/06 |
| CN | 112118221 | A | * | 12/2020 | G06F 21/6263 |
| CN | 112532711 | A | * | 3/2021 | |
| CN | 113287141 | A | * | 8/2021 | H04L 63/0428 |
| CN | 107924323 | B | * | 3/2022 | G06F 8/60 |
| EP | 4009151 | A1 | * | 6/2022 | G05B 19/4155 |
| WO | WO-2021086368 | A1 | * | 5/2021 | G06F 8/60 |

OTHER PUBLICATIONS

Ismail et al., "Evaluation of Docker as Edge Computing Platform", 2015, IEEE (Year: 2015).*

Hsieh et al., "Mobile Edge Computing Platform with Container-Based Virtualization Technology for IoT Applications", May 2018, Springer (Year: 2018).*

Bulkan et al., "On the Load Balancing of Edge Computing Resources for On-Line Video Delivery", 2018, IEEE Access (Year: 2018).*

Singh et al., "Server-Storage Virtualization: Integration and Load Balancing in Data Centers", 2008, IEEE (Year: 2008).*

\* cited by examiner

SCALABLE, ROBUST, AND SECURE MULTI-TENANT EDGE ARCHITECTURE FOR MISSION-CRITICAL APPLICATIONS

CROSS-REFERENCE TO RELATED APPLICATION

The present application claims the benefit of U.S. Provisional Patent Application No. 63/132,373 filed Dec. 30, 2020, and entitled "A SCALABLE, ROBUST, AND SECURE MULTI-TENANT EDGE ARCHITECTURE FOR MISSION-CRITICAL APPLICATIONS," the disclosure of which is incorporated by reference herein in its entirety.

TECHNICAL FIELD

The present disclosure relates generally to an edge architecture, and more particularly to a scalable, robust, and secure multi-tenant edge architecture.

BACKGROUND

Migration of applications to the cloud has been driven in large part due to the limitations inherent in on-premises systems, such as lack of scalable infrastructure, inability to handle full loads, and lack of ease of maintenance. Cloud systems have attempted to address such limitations, and more and more applications have been migrated to the cloud as a result. However, cloud systems also present limitations. For example, computing resources may be far from an application that might need those resources. This can create issues with undue latency and cost. Advances in machine learning (ML) and artificial intelligence (AI), coupled with increasingly inexpensive and available computing power from Moore's Law pace innovation, and the movement towards graphical processing unit (GPU) and field-programmable gate array (FPGA) computing, have made it possible to perform analysis on low-cost edge devices that would have required a big-data cluster a few years ago. As a result, as reliance on analytics from machine data has increased in recent years, so has the movement of computing capabilities from the remote cloud to the edge. Edge systems (e.g., systems in which the computing resources are placed the "edge" of the network, or a location closer to the application that might need the computing resources rather than a remote location) allow a reduction in latency and provide more processing of data close to the application, which is especially important for mission critical tasks where downtime is unacceptable.

Nonetheless, existing edge systems are single-node systems that lack scalability and redundancy. Hence, edge platforms are not currently suitable for mission-critical communication or applications. Additionally, current edge systems are limited in their security, performance, and reliability for use in edge computing.

SUMMARY

Aspects of the present disclosure provide systems, methods, and computer-readable storage media that support cross-server containerized application allocation, multi-tenant namespace management, and data layer deployment in an edge environment. In aspects, containers associated with an application are deployed to edge servers based on a geographic characteristic of the edge server with respect to an edge device receiving services from the application. A common data layer is provided across the edge environment to manage communications between the different containers, and between the application and other applications of the edge environment, as well as to connect devices across the edge environment. Managing the communication is based on namespaces and/or a modality (e.g., private or public) associated with the application. Authentication configuration of the application may be used to determine and/or confirm an identity, and the identity may be used to determine edge resource access for the containers of the application. A common orchestration layer is provided across the edge environment to manage scaling and configuration updates of the application.

In aspects of the present disclosure, multi-tenancy functionality may be provided to enable an edge system to deploy and isolate multiple instances of an application in the edge system based on security configurations of containers to provide improved security and management, as applications from different vendors may be deployed in the edge system and kept secure from each other. Additionally, the edge system may share information between different applications when authorization is given.

In aspects, a method for managing deployment of an application across a plurality of servers in an edge system is provided. The method includes receiving a registration of the application. In aspects, the registration indicates a location of a source code and/or binaries associated with the application. The method also includes obtaining configuration of the application based on the code and/or binaries, and identifying at least one server of the plurality of servers to deploy at least one container associated with the application. In aspects, the identifying is based on a geographic characteristic of the at least one server with respect to an edge device receiving a service from the application. The method also includes deploying the application based on the configuration, and deploying the application may include deploying the container in the server.

In additional aspects, an edge system for managing deployment of an application across a plurality of servers in the edge system is provided. The edge system comprises a configuration manager running on at least one server of the edge system configured to perform operations including receiving a registration of the application. In aspects, the registration indicates a location of an executable code associated with the application. The operations further include obtaining configuration of the application based on the executable code, and identifying at least one server of the plurality of servers to deploy at least one container associated with the application. In aspects, identifying the at least one server is based on a geographic characteristic of the at least one server with respect to an edge device receiving a service from the application. The edge system also includes a container manager running on the at least one server of the edge system, the container manager configured to perform operations including deploying the application based on the configuration, the deploying including deploying the container in the at least one server.

In additional aspects, a device for managing deployment of an application across a plurality of servers in an edge system is provided. The device comprises at least one processor and a memory coupled to the at least one processor. The at least one processor is configured to perform operations including receiving a registration of the application. In aspects, the registration indicates a location of a source code and/or binaries associated with the application. The operations also include obtaining configuration of the application based on the code and/or binaries, and identifying at least one server of the plurality of servers to deploy at least one container associated with the application. In aspects, identifying the at least one server of the plurality of servers is based on a geographic characteristic of the at least one server with respect to an edge device receiving a service from the application. The operations also include deploying the application based on the configuration, and deploying the application may include deploying the container in the server.

The foregoing has outlined rather broadly the features and technical advantages of the present disclosure in order that the detailed description that follows may be better understood. Additional features and advantages will be described hereinafter which form the subject of the claims of the disclosure. It should be appreciated by those skilled in the art that the conception and specific aspects disclosed may be readily utilized as a basis for modifying or designing other structures for carrying out the same purposes of the present disclosure. It should also be realized by those skilled in the art that such equivalent constructions do not depart from the scope of the disclosure as set forth in the appended claims. The novel features which are disclosed herein, both as to organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

For a more complete understanding of the present disclosure, reference is now made to the following descriptions taken in conjunction with the accompanying drawings, in which.

It should be understood that the drawings are not necessarily to scale and that the disclosed aspects are sometimes illustrated diagrammatically and in partial views. In certain instances, details which are not necessary for an understanding of the disclosed methods and apparatuses or which render other details difficult to perceive may have been omitted. It should be understood, of course, that this disclosure is not limited to the particular aspects illustrated herein.

DETAILED DESCRIPTION

Various features and advantageous details are explained more fully with reference to the non-limiting embodiments that are illustrated in the accompanying drawings and detailed in the following description. Descriptions of well-known starting materials, processing techniques, components, and equipment are omitted so as not to unnecessarily obscure the invention in detail. It should be understood, however, that the detailed description and the specific examples, while indicating embodiments of the invention, are given by way of illustration only, and not by way of limitation. Various substitutions, modifications, additions, and/or rearrangements within the spirit and/or scope of the underlying inventive concept will become apparent to those skilled in the art from this disclosure.

Cloud computing provides a robust computing system that can be leveraged by applications running on devices (e.g., internet of things (IoT) devices), although the computing resources of a cloud system are typically remote to the application and as such suffer from high latency and connectivity disruptions due to the multiple interceding devices and systems. In addition, the rapidly expanding need for "smart" devices and real-time control, such as IoT applications, have highlighted those limitations of cloud-only systems. As such, edge systems may be leveraged to provide the benefits of on-premises control and real-time analytics coupled with the large computing and integrations resources of cloud systems. However, current edge systems are single-node systems that lack scalability and redundancy to provide an effective solution, such as a solution with comparable capabilities and functionality to a full cloud solution (e.g., a solution that is able to run with 'on-premises' connectivity and features of a cloud-native application).

Aspects of the present disclosure may provide for systems, methods, apparatus, and computer-readable storage media that provide an edge architecture that supports cross-server containerized application allocation, multi-tenant namespace management, and data layer deployment in accordance with aspects of the present disclosure. An edge system implemented in accordance with aspects of the present disclosure may be cloud agnostic, highly performant, easily deployable and updatable, and may support multi-tenant applications. In particular, the edge architecture of embodiments may provide a fully featured, modular, and adaptable edge deployment that may be compatible with any cloud platform, may include features that are beyond the existing scope of current edge systems (e.g., IoT edge systems), and may reduce the amount of custom work to prevent vendor lock-in, as will be discussed in more detail below. As such, the edge architecture of embodiments addresses the limitations of current edge systems and provides a technical improvement over such existing systems. In particular aspects of the present disclosure, an edge system may be implemented to provide geographic based allocation of containerized applications across a set of servers to reflect real-world device distribution and loads. In some aspects, the edge system may include public and private services with quality of service (QoS) guarantees and built-in security though managed namespaces and multi-tenant authentication. Furthermore, in aspects, a highly performant data layer and managed containerized deployments enable the edge system to allow tenant applications to be developed without concern for distribution, scaling, etc. As such, the edge system of embodiments may be fault tolerant and may include functionality to support a failure of hardware to detect a failure and to automatically reassign work/tasks to other nodes (e.g., non-failing nodes). In some aspects, edge systems implemented in accordance with aspects of the present disclosure may include functionality to handle failures with the hardware, such as failures due to overload, improper version control, etc., whereas current edge systems may not include such functionality. In aspects, the edge system of embodiments may be able to organically scale with application load. For example, the edge system of embodiments may enable control of a fleet of devices with real-time control of on-premises operations, while at the same time leveraging full analytics capabilities of a cloud system.

Aspects of the present disclosure provide for an edge system that is highly scalable and reliable. For example, edge systems implemented in accordance with aspects of the present disclosure may provide cluster-based container orchestration features at the edge. As such, edge computing workloads (e.g., edge services) may be deployed to any number of edge computers, allowing for seamless handling of hardware failures and the ability to add additional nodes to provide increases in linear performance.

Edge systems implemented in accordance with aspects of the present disclosure may also provide a performant and reliable data layer. The performant and reliable data layer of aspects may be network independent and may address the increasing data volumes and low-latency requirements of modern devices and edge workloads, by providing a platform-agnostic, extremely high performance message broker and object store, which can scale across multiple nodes to provide redundancy and increased performance. In aspects, the data layer may be implemented to leverage messaging and object management technology to provide the functionality described herein.

Edge systems implemented in accordance with aspects of the present disclosure may also provide a configuration management that may allow leveraging source code management technology to manage edge configuration and software management, and to provide security, version control, and permission management for configuration and deployment using established tools and practices.

Systems may also provide for multi-tenant security. In aspects, cluster-based container orchestration and the data layer of edge systems may allow for best-practice encryption (e.g., at-rest and in-transit) of data and granular access management, which may allow for organizations to deploy software and manage edge workloads while keeping data private from other organizations, and may also allow an edge administrator to control access rights and resource allocations.

Figure 1:
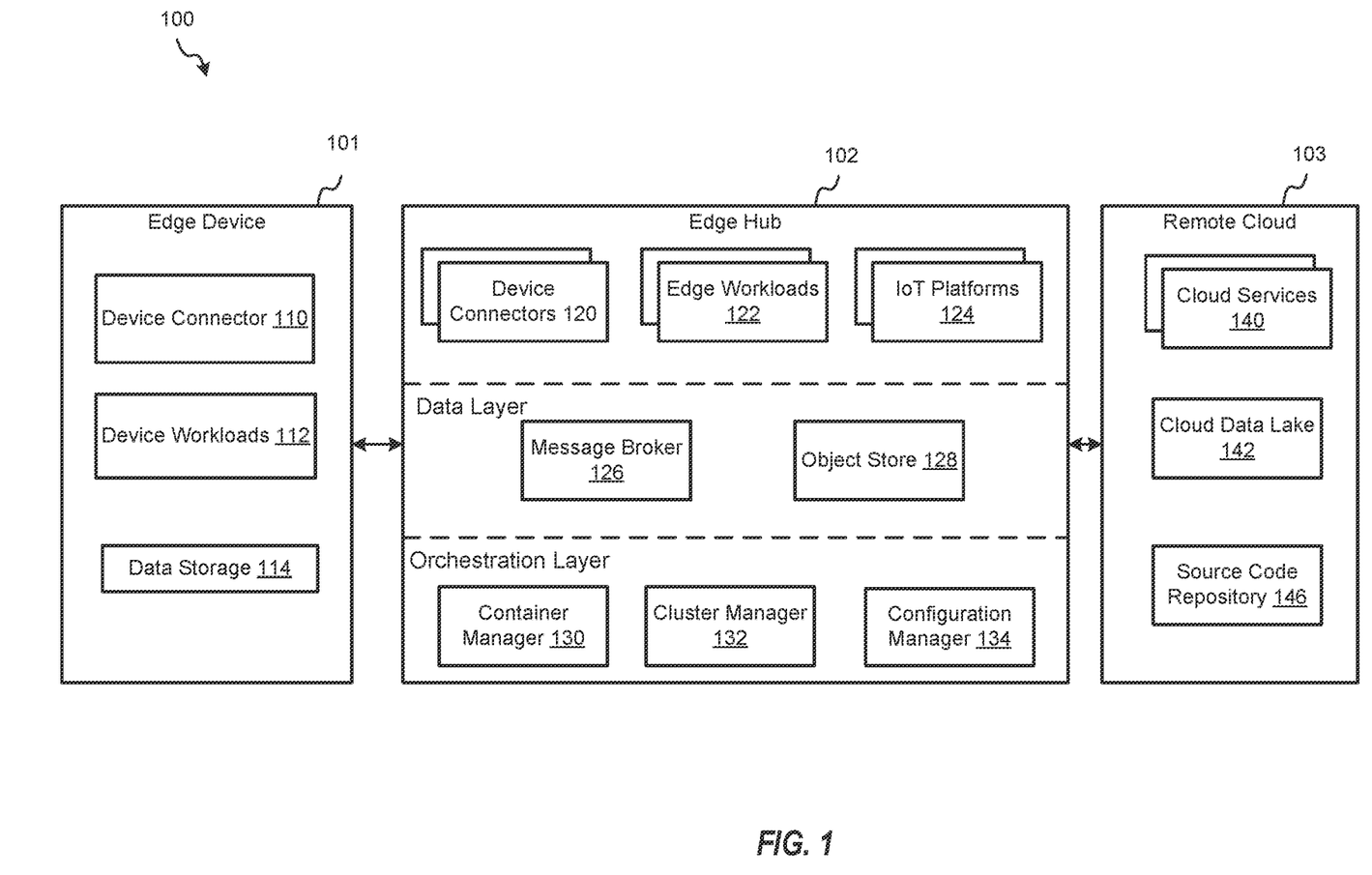
FIG. 1 is a block diagram of an example of a system that supports allocation of a containerized application across a set of servers and multi-tenancy functionality according to one or more aspects.

Referring to FIG. 1, an example of a system that supports deployment of an edge architecture that supports cross-server containerized application allocation, multi-tenant namespace management, and data layer deployment according to one or more aspects of the present disclosure is shown as a system 100. System 100, or components thereof, may be deployed in the edge, and may provide benefits related to latency reduction and a fully featured edge environment. In some examples, system 100 may be deployed in various operational environments. For example, in one particular example, system 100 may be deployed in hospital environment, where devices and agents (e.g., operation robots, diagnostic equipment, etc.) may be deployed on-premises. In this particular example, the various devices may represent different services from different tenants (e.g., different vendors, different systems, etc.). In another example, system 100 may be deployed in a warehouse environment, where devices and agents (e.g., industrial robots, inventory devices, smart devices, etc.) may be deployed on-premises.

As shown in FIG. 1, the system 100 includes one or more edge devices 101, edge hub 102, and remote cloud 103. These components, and their individual components, may cooperatively operate to provide functionality in accordance with the discussion herein. For example, in operation according to embodiments, edge device 101 may be configured to support execution of device workload 112, which in some implementations may represent a device service or a device application, within the environment of edge device 101. In aspects, the functionality of device workload 112 running on edge device 101 may provide functionality that is dependent on the type of device of edge device 101. For example, device workload 112 running on a sensor may facilitate collection of data and/or measurements specific to the type of sensor. In another example, device workload 112 running on a camera may facilitate face recognition functionality. In this case, device workload 112 running on the camera may collect images and may provide the collected data (e.g., images) to an edge server, or edge servers, of edge hub 102 for performing face recognition. In this manner, the functionality of edge hub 102 may perform edge operations, such as mission critical operations for which the low-latency capabilities of on-premises and/or edge functionality may provide a benefit with respect to latency, while also leveraging the full analytics capability of large scale data centers associated with remote cloud 103. Specifically, in embodiments, device workload 112 running on edge device 101 may communicate (e.g., over a message broker 126 of edge hub 102) via device connector 110 with at least one edge workload 122 of edge hub 102 using encrypted communications. In aspects, device connector 110 may be a containerized component that is used to communicate device workload 112 information to edge hub 102. In aspects, device workload 112 information may include, for example, management and control information or requests, information for ML modules, etc., collected or generated by edge device 101. In aspects, edge workload 122 may include a set of containers, and the set of containers (e.g., the edge workload) may represent an application. In aspects, the set of containers may include one or more container. In aspects, the containers in the set of containers may be distributed across different components (e.g., edge servers) of the edge environment. Edge workload 122 may be configured to provide a service to device workload 112 to leverage the greater processing resources of the edge servers of edge hub 102. In aspects, an orchestration layer may provide functionality to automatically manage a number of containers in the set of containers to include in the workload, as well as determine and manage where each container of the set of containers is running (e.g., which edge server a container is running).

What follows below is a more detailed discussion of the functional blocks of system 100 shown in FIG. 1. However, it is noted that the functional blocks, and components thereof, of system 100 of embodiments of the present invention may be implemented using processors, electronic devices, hardware devices, electronic components, logical circuits, memories, software codes, firmware codes, etc., or any combination thereof. For example, one or more functional blocks, or some portion thereof, may be implemented as discrete gate or transistor logic, discrete hardware components, or combinations thereof configured to provide logic for performing the functions described herein. Additionally or alternatively, when implemented in software, one or more of the functional blocks, or some portion thereof, may comprise code segments operable upon a processor to provide logic for preforming the functions described herein.

It is also noted that various components of system 100 are illustrated as single and separate components. However, it will be appreciated that each of the various illustrated components may be implemented as a single component (e.g., a single application, server module, etc.), may be functional components of a single component, or the functionality of these various components may be distributed over multiple devices/components. In such aspects, the functionality of each respective component may be aggregated from the functionality of multiple modules residing in a single, or in multiple devices. For example, although edge hub 102 is illustrated as a single component, edge hub 102 may be distributed over multiple devices/components. As such, the illustration of these components, or any other components, as a single component should not be construed as limiting in any way.

It is further noted that functionalities described with reference to each of the different functional blocks of system 100 described herein is provided for purposes of illustration, rather than by way of limitation and that functionalities described as being provided by different functional blocks may be combined into a single component or may be provided via computing resources disposed in a computing environment accessible over a network.

Edge device 101 may include device connector 110, device workloads 112, and data storage 114. In aspects, edge device 101 may represent one or more devices that may be used in different operational environments in edge system 100. For example, edge device 101 may represent devices such as robots, communications devices, control devices, transportation devices, sensors, medical devices, IoT devices, video cameras, drones, etc. As such, edge device 101 may represent any device that may be deployed in an environment and that may be operated, controlled, processed, or otherwise may leverage communication capabilities with edge hub 102 (e.g., to leverage the computing resources of an edge server of edge hub 102). Although a single edge device 101 is illustrated in FIG. 1, system 100 may include a plurality of edge devices 101, which may be similar devices, or may be different devices (e.g., may include different components).

In aspects, edge device 101 may be equipped with some limited processing resources, e.g., to perform data collection and/or generation, and/or some limited processing on the data. In addition, the processing resources of edge device 101 may allow for the execution of device connector 110 and device workloads 112. As noted above, device connector 110 may be a containerized component that is used to communicate device workloads 112 information to edge hub 102. In some aspects, the communication between device workloads 112 and edge hub 102 may be over a message broker, described in more detail below, and may use device connector 120 of edge hub 102. As also noted above, each of device workloads 112 may represent an application running on edge device 101.

As shown, edge device 101 also includes data storage 114. Data storage 114 may include storage of data that may be used to support the functionality of edge device 101. For example, data storage 114 may configuration data, models, and may also include instructions to be executed by a processor to provide an execution environment for device connector 110 and device workloads 112.

Edge hub 102 may be configured to provide an environment and infrastructure for deploying and executing edge applications or services that enable edge devices to leverage the processing resources of edge servers, while also leveraging the large processing resources of a cloud system, in accordance with aspect of the present disclosure. In particular, edge hub 102 may be configured to provide components to manage the cloud agnostic, containerized, and load-balanced deployment of applications over various edge servers. To that end, edge hub 102 may be configured to provide a geographic based allocation of containers in a set of containers of an application across a set of edge servers to reflect real-world distribution of edge devices in a deployment, as well as loads. In addition, edge hub 102 may be configured to include public and private edge applications with QoS guarantees and built-in security though managed namespaces and multi-tenant authentication. Furthermore, edge hub 102 may be configured to include a data layer and an orchestration layer to manage the deployments of the containers to enable system 100 to allow tenant applications to be developed without concern for distribution, scaling, etc.

As shown in FIG. 1, edge hub 102 may include device connectors 120, edge workloads 122, and IoT platforms 124. In addition, a data layer of hub 102 may include message broker 126 and object store 128. Furthermore, an orchestration layer of edge hub 102 may include container manager 130, cluster manager 132, and configuration manager 134.

Edge workloads 122 may be containerized across a number of different components (e.g., edge servers) of the edge environment. For example, edge workloads 122 may represent at least one edge application or service that provides functionality to edge device 101 to leverage the computing resources of the edge servers of edge hub 102, while also leveraging the large computing resources of remote cloud 103. Each edge workload of edge workloads 122 may include a set of containers. This set of containers may be referred to as an edge cluster. In aspects, the containers in the set of containers may be scheduled and/or executed in any edge server of the edge environment of system 100. In some aspects, any number of containers in the set of containers may be executed in different edge servers. As such, although the containers may run on different physical edge servers, the edge cluster may be managed and addressed as a unit.

Device connectors 120 may include one or more device connectors configured to facilitate communications between edge device 101 and edge hub 102. In aspects, each of device connectors 120 may be a containerized component, and communication between edge device 101 and edge hub 102 may be over message broker 126 of the data layer of edge hub 102, described in more detail below.

IoT platforms 124 may include containerized connectors that interface the functionality of edge hub 102 with the functionality of remote cloud 103. In particular, IoT platforms 124 may represent a workload that is shared with cloud services 140 of remote cloud 103 and that may be augmented with additional workloads that are running on the edge. In aspects, IoT platforms 124 may provide an environment on edge system 100 that may be similar to an environment on the cloud (e.g., remote cloud 103). In this manner, workloads may be run/deployed in the edge and/or in the cloud without modifications. In some aspects, configuration of IoT platforms 124 may be dynamic, and may function to move a workload from the cloud to the edge based on performance criteria, for example. In some aspects, IoT platforms 124 may provide functionality that may be leveraged from cloud systems provided by cloud vendors, which may provide an agnostic edge environment.

In aspects, the data layer of edge hub 102 may include message broker 126. Message broker 126 may be configured to facilitate secure communications between the various components of edge system 100. In particular, message broker 126 may be configured to manage communications between different edge services, edge workloads, or edge clusters, and/or between different containers of an edge workload. In aspects, messages exchanged between the different components may be small in size. In order to address this message size limitation of the message broker, object store 128 may be provided. Object store 128 may be configured to store files that may be uploaded, edited, modified, or otherwise manipulated by an edge service. In some aspects, object store 128 may be configured to synchronize with cloud data lake 142 of remote cloud 103. In aspects, message broker 126 and object store 128 of the data layer may be configured to cooperatively operate to provide functionality for secure communication between the different components using at-rest encryption and/or in-transit encryption of messages between the different components. In aspects, the encryption may be performed using security tokens, such as tokens, certificates, and/or public key infrastructure (PKI) keys. Individual messages may be encrypted and transmitted, or may remain encrypted while the messages are still on disk.

In aspects, message broker 126 and object store 128 allow for the data layer of edge hub 102 to be a vendor agnostic data layer. In particular aspects, the vendor agnostic data layer of edge hub 102 may be configured to allow for devices and workloads from any vendor to be deployed on edge system 100, and to be able to communicate with other components of edge system 100. In aspects, this may be performed by allowing direct communication between a device (e.g., edge device 101) and the data layer, or by providing pre-built protocol conversion 'shims' to convert messages for common protocols that devices may use to communicate with the data layer. This approach also permits the existing commercial edge solutions from major cloud vendors, which are based on containerization, to run in full instances on the edge.

Figure 2:
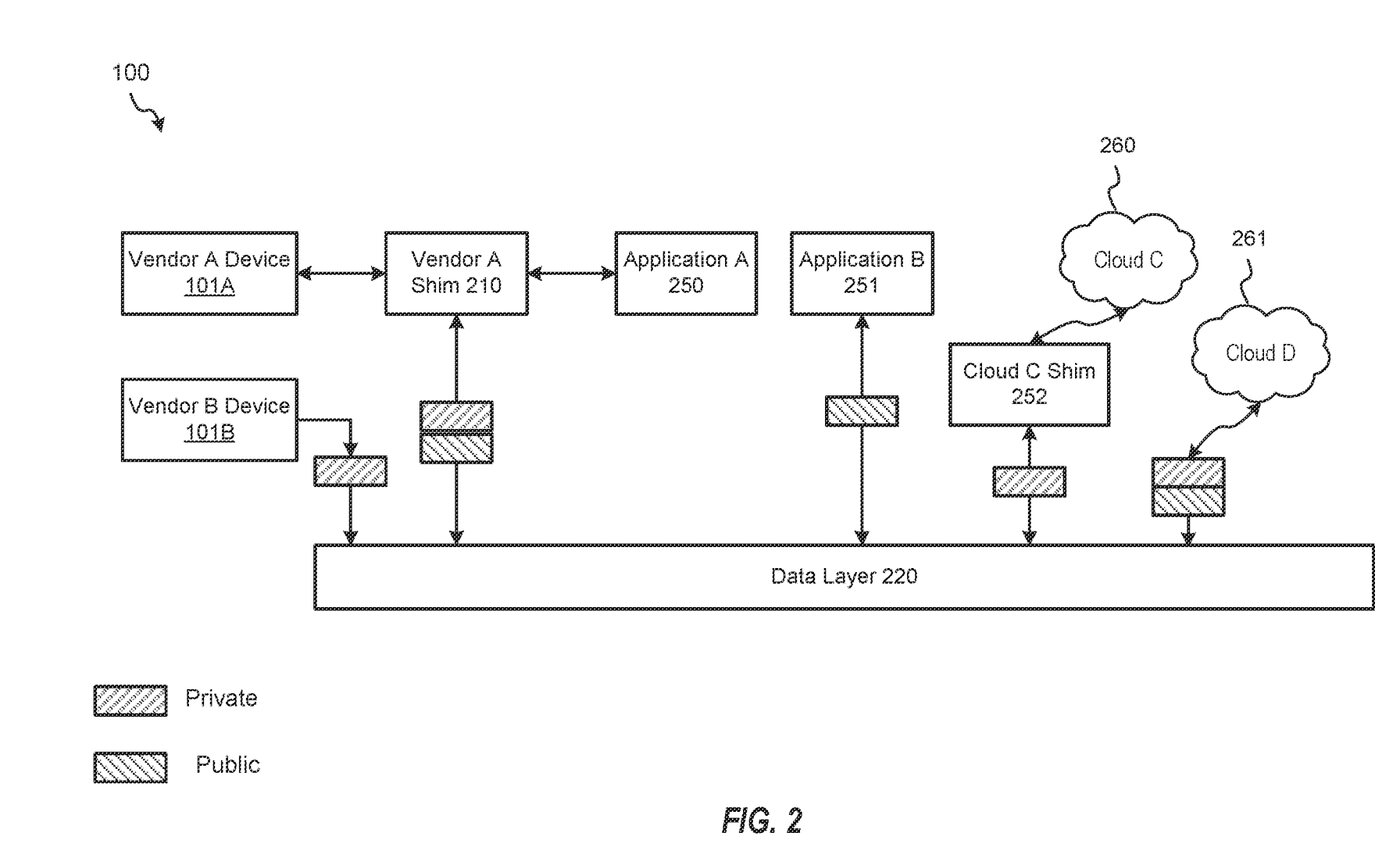
FIG. 2 is a block diagram illustrating an example of data layer communications between components of an edge system according to one or more aspects.

FIG. 2 is a block diagram illustrating an example of data layer communications between components of an edge system. In particular, data layer 220 may be configured in accordance with aspects of the present disclosure, and may facilitate vendor agnostic communications between the different components of the edge system. In the example illustrated in FIG. 2, edge devices may communicate with an edge hub (e.g., edge hub 102 of FIG. 1) directly, or via pre-built protocol conversion "shims." For example, vendor B device 101B may communicate with data layer 220 directly, as illustrated in FIG. 2. In addition, vendor A device 101A communicates with data layer 220 using vendor A shim 210. In aspects, vendor A shim 210 may be a shim configured to convert messages from devices and/or components associated with vendor A to communicate with the data layer.

In some aspects, applications may communicate with other applications, or with the edge hub, directly through data layer 220, or via pre-built protocol conversion shims. For example, application B 251 may communicate directly through data layer 220, as illustrated in FIG. 2. In this example, application A 250 may communicate using vendor A shim 210.

In some aspects, messages from a cloud system may also be transmitted directly via data layer 220, or may use a shim. For example, cloud D 261 may communicate directly through data layer 220, as illustrated in FIG. 2, while messages from cloud C 260 may be communicated to other components using cloud C shim 252.

In some aspects, communications between the different components of edge system 100 may have a public modality, a private modality, or even a specific correspondence between two components. In some aspects, applications and services may be public or private to components associated with a particular vendor. In these aspects, a vendor pattern may be employed to allocate different namespaces for communications that happen in a public modality, a private modality, or in specific correspondence between two applications. For example, in a namespace allocated for private modality for a vendor A, messages within the private namespace for vendor A may be available to any application or services, or component associated with vendor A. However, in these examples, messages within the private namespace for vendor A may not be available to any application or services, or component that is not associated with vendor A. In another example, a namespace may be allocated for private modality for vendor A and another vendor B. In this case, messages within the private namespace for vendors A and B may be available to any application or services, or component associated with vendor A and/or B. In another example, where a namespace is allocated for public modality for vendor A, messages within the namespace may be available to any application or services that is registered on the edge hub.

Referring back to FIG. 1, the orchestration layer of edge hub 102, which may include container manager 130, cluster manager 132, and repo configuration manager 134, may be configured to provide functionality for managing the configuration, scheduling, and deployment of workloads and containers on edge servers of edger system 100. In particular, the orchestration layer of edge hub 102 may provide an abstraction of edge resources to the different applications by providing functionality to schedule and deploy different containers of an application to different edge servers, while providing functionality to manage those containers as edge clusters. As such, although the containers may run on different physical edge servers, the edge cluster may be managed and addressed as a unit. In aspects, the functionality of the orchestration layer is provided by the cooperative operation of container manager 130, cluster manager 132, and repo configuration manager 134.

Configuration manager 134 may be configured to manage the configuration of an application, or edge cluster. As noted above, an application may include a set of containers, which may also be referred to as an edge cluster. Configuration manager 134 may interface and communicate with a source code repository (e.g., source code repository 146) and may obtain the source code and/or binaries for deploying the application from the source code repository. In addition, in some aspects, configuration manager 134 may obtain configuration information configuring the edge cluster and all resources within it. In some aspects, configuration manager 134 may be configured to track changes in the repository, to pull and obtain the changes, and to apply the changes to the edge cluster.

Figure 3:
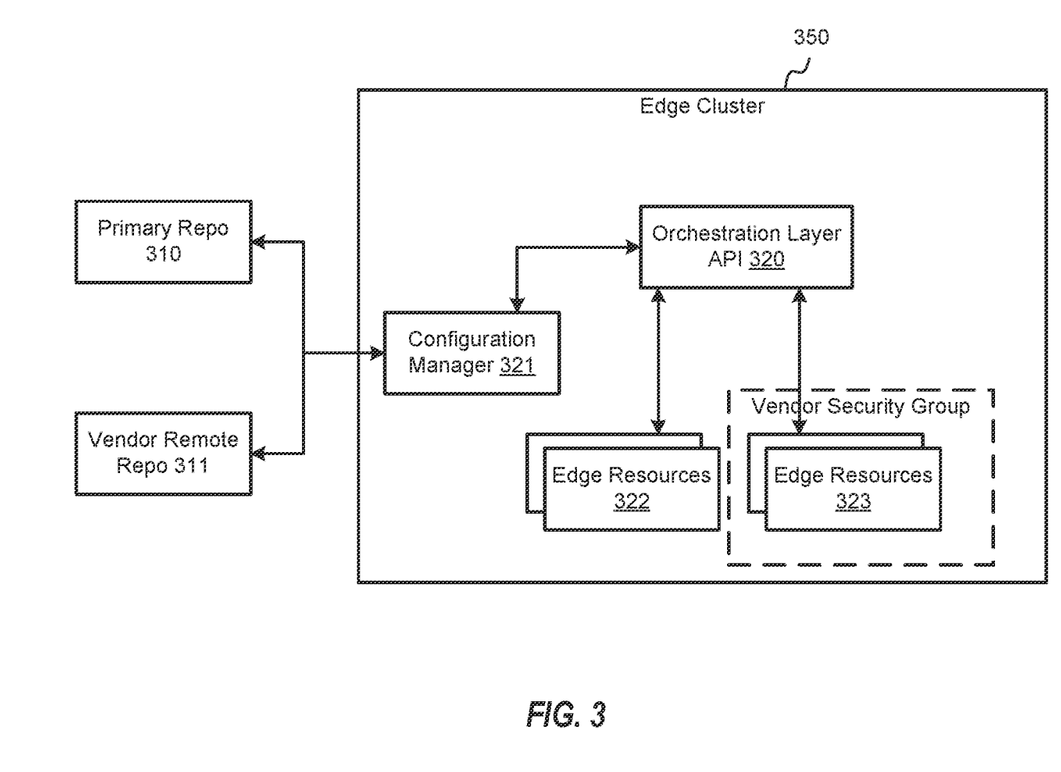
FIG. 3 is a block diagram illustrating an example of edge cluster configuration functionality according to one or more aspects.

FIG. 3 is a block diagram illustrating an example of edge cluster configuration functionality in accordance with aspects of the present disclosure. In some aspects, a vendor may register a service or application. As part of the registration, the vendor may specify the location of the source code associated with the application, e.g., a source code repository. In the example illustrated in FIG. 3, edge cluster 350 to be deployed may be configured by the source code repository specified in the registration. For example, as shown in FIG. 3, primary repo 310 may be specified as the source code repo and may be a primary repo that configures edge cluster 350 and all resources within. In aspects, vendor remote repo 311 may be provided. Vendor remote repo 311 may include one or more secondary repos configured to provide specific permissions and limitations. In this manner, vendor remote repo 311 may be used to configure limited access to edge cluster 350 for certain entities, parties, components, etc.

Configuration manager 321 may be configured to obtain the configuration information for edge cluster 350 and to facilitate the other components of the edge hub's orchestration layer, to deploy and manage edge cluster 350. In aspects, configuration manager 321 may use orchestration layer API 320 to cause the deployment of edge cluster 350 on various and/or different edge resources (e.g., edge resources 322 and 323). In some aspects, as illustrated in FIG. 3, specific vendors of vendor remote repo 311 may be configured with different permissions for accessing edge resources 322 and/or resources 323. For example, a vendor may be configured with permissions associated with a vendor security group, which may provide the vendor access to edge resources 323, but no access to edge resources 322.

In aspects, configuration manager 321 may be configured to provide software version control and management functionality. For example, in some aspects, configuration manager 321 may be configured to obtain and track the version of the different software operating in edge cluster 350. As noted above, different vendors may deploy different software in the platform. In some example, the software from the different vendors may depend on or operate in cooperation with other software or services. For example, in a site, a robot may operate to transport products from one location to another. In this example, the robot's mobility may be provided by a first software and the robot's vision may be provided by a second software. In this example, the vision software vendor may update the vision software and may wish to push it to the robot. Without version control, the vision software may be pushed to the robot, but this may cause unforeseen problems with the robot's mobility problems, as there is no control as to whether the new version of the vision software is compatible with the mobility software. In aspects, configuration manager 321 may be configured to provide version control for managing the versions of software that are being deployed to the edge platform of embodiments. In aspects, a separate service may track all the different versions and interfaces for the different services that may be provided in the edge platform (e.g., a registry of the different versions may be kept and/or stored). When a new version of software is deployed, configuration manager 321 may cause a validation procedure to be performed. In aspects, the validation procedure may include testing the new version of the software to ensure that the new version of the software is compatible with any other software or services affected by the new version (e.g., software that the new version may depend on and/or cooperate with to perform a function). In some aspects, the validation procedure may include approval from third party vendors. For example, where a new version of software affects a service provide by a third party, configuration manager 321 may require approval from the third party before validating and/or deploying the new version of software.

In some aspects, after edge cluster 350 has been deployed and is running, configuration manager 321 may run within edge cluster 350 and may continually poll the source code repo(s) for changes. In these cases, if a change in the source code repo is detected, the change may be validated and configuration manager 321 may use orchestration layer API 320 to apply the changes to edge cluster 350. In some aspects, if applying the changes to the to edge cluster 350 causes a failure, configuration manager 321 may automatically roll back the configuration and/or source code to the last known good configuration.

Referring back to FIG. 1, container manager 130 may be configured to deploy the edge cluster in accordance with the edge cluster configuration. In particular, container manager 130 may be configured to schedule and deploy the individual containers included in the edge cluster. In aspects, container manager 130 may determine, for each container to be deployed for the edge cluster, an edge server in which to deploy the container. In aspects, the containers of the edge cluster may be deployed in different physical edge servers. In aspects, the edge server in which a container may be deployed may be determined based on a geographic location of an edge device associated with the application corresponding to the edge cluster.

Cluster manager 132 may be configured to manage, maintain, and scale the edge cluster based on data requirements and/or load balancing determinations. In aspects, cluster manager 132 may maintain the edge cluster by assigning individual containers to edge servers as required. For example, a particular edge server where a container may be deployed may fail. In this case, cluster manager 132 may reassign the container to another edge server.

In aspects, cluster manager 132 may scale the edge cluster, e.g., by deploying, or causing container manager 130 to deploy, additional containers to meet increased load. For example, resource utilization in containers may be monitored. In this case, when pre-defined utilization limits are reached, additional replicas of containers may be created and destroyed automatically. In some aspects, backpressure based scaling is used when containerized workloads consume messages from queues. Replicas of containers may be created and destroyed based on the number of unread messages in a queue, allowing system 100 to dynamically respond to increases in workload.

Figure 4:
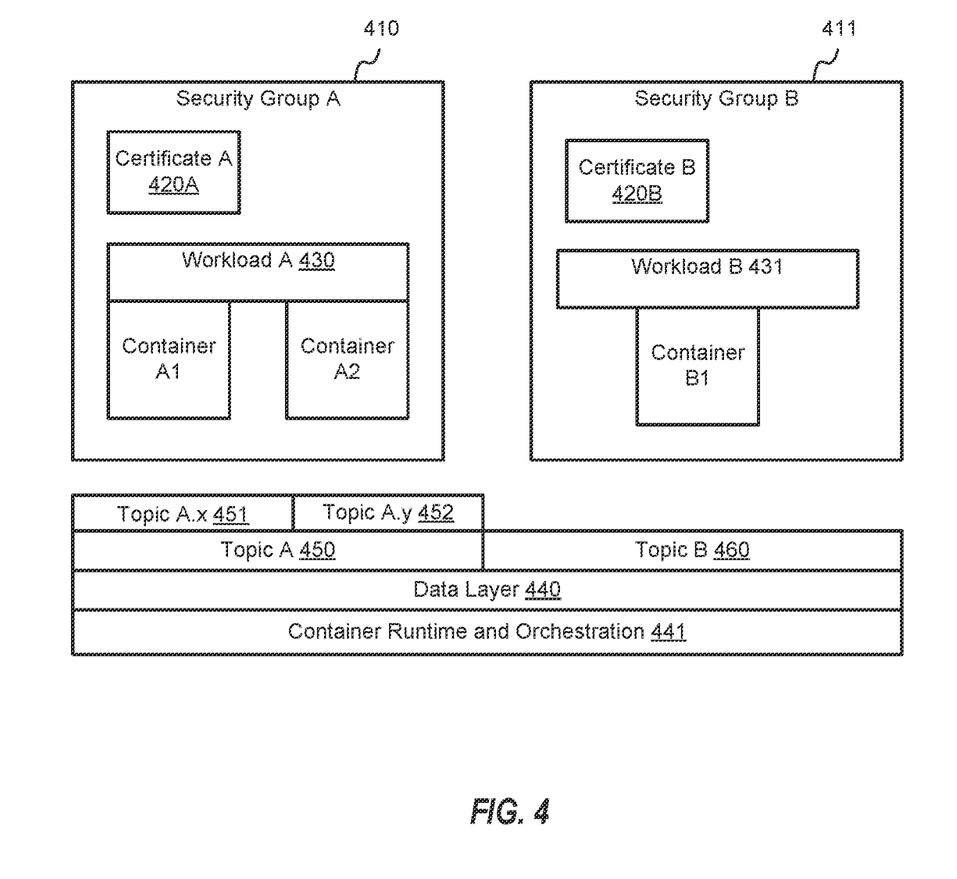
FIG. 4 is a block diagram illustrating an example of multi-tenancy functionality of an edge system provided according to one or more aspects.

Cluster manager 132 may also be configured to enable secured multi-tenancy functionality. FIG. 4 is a block diagram illustrating an example of multi-tenancy functionality of an edge system provided in accordance with aspects of the present disclosure. In particular, the multi-tenancy functionality provided by aspects of the present disclosure allows an edge system (e.g., system 100) to deploy and isolate multiple instances of an application based on security configurations of the containers. For example, as shown in FIG. 4, workload A 430 may include containers A1 and A2, and workload B 431 includes container B1. In this example, workload A 430 may belong to security group A 410, and workload B may belong to security group B 411. In aspects, container networking and resource access may be configured for each security group. In this case, access to resources by a container may be configured based on a security group to which the container belongs. In some aspects, access to resources by a container may be configured based on credentials, an intermediate certificate that may be used to sign a container, or device certificates. For example, security group A 410 may be associated with certificate A 420A, and containers A1 and A2 may be signed with certificate A 420A. As such, access to resources by containers A1 and A2 may be determined based on certificate A 420A. Security group B 411 may be associated with certificate B 420B, and container B1 may be signed with certificate B 420B. As such, access to resources by containers A1 and A2 may be determined based on certificate A 420A and access to resources by container B1 may be determined based on certificate B 420B. A common data layer 440 and a common orchestration layer 441 may also be provided to enable functionality for communication and container management for the edge components across the edge resources, in accordance with the description herein. In embodiments, common data layer 440 may function to connect devices across the edge environment.

In some aspects, data layer topics and objects may have access configured by application or by security group. For example, topic A 450 and topic B 460 may have associated configuration specifying resource access. In this case, resource access by workload A 430 may be determined by the access configuration of topic A 450. In this example, resource access by workload B 431 may be determined by the access configuration of topic B 460. In some aspects, sub-topics (e.g., topic A.x 451 and/or topic A.y 452) may have unique access settings specified. In this case, resource access by particular containers may be determined by the access configuration of the subtopic. For example, container A1 may have resource access configuration based on the access configuration of topic A.x 451, and container A2 may have resource access configuration based on the access configuration of topic A.y 452.

Figure 5:
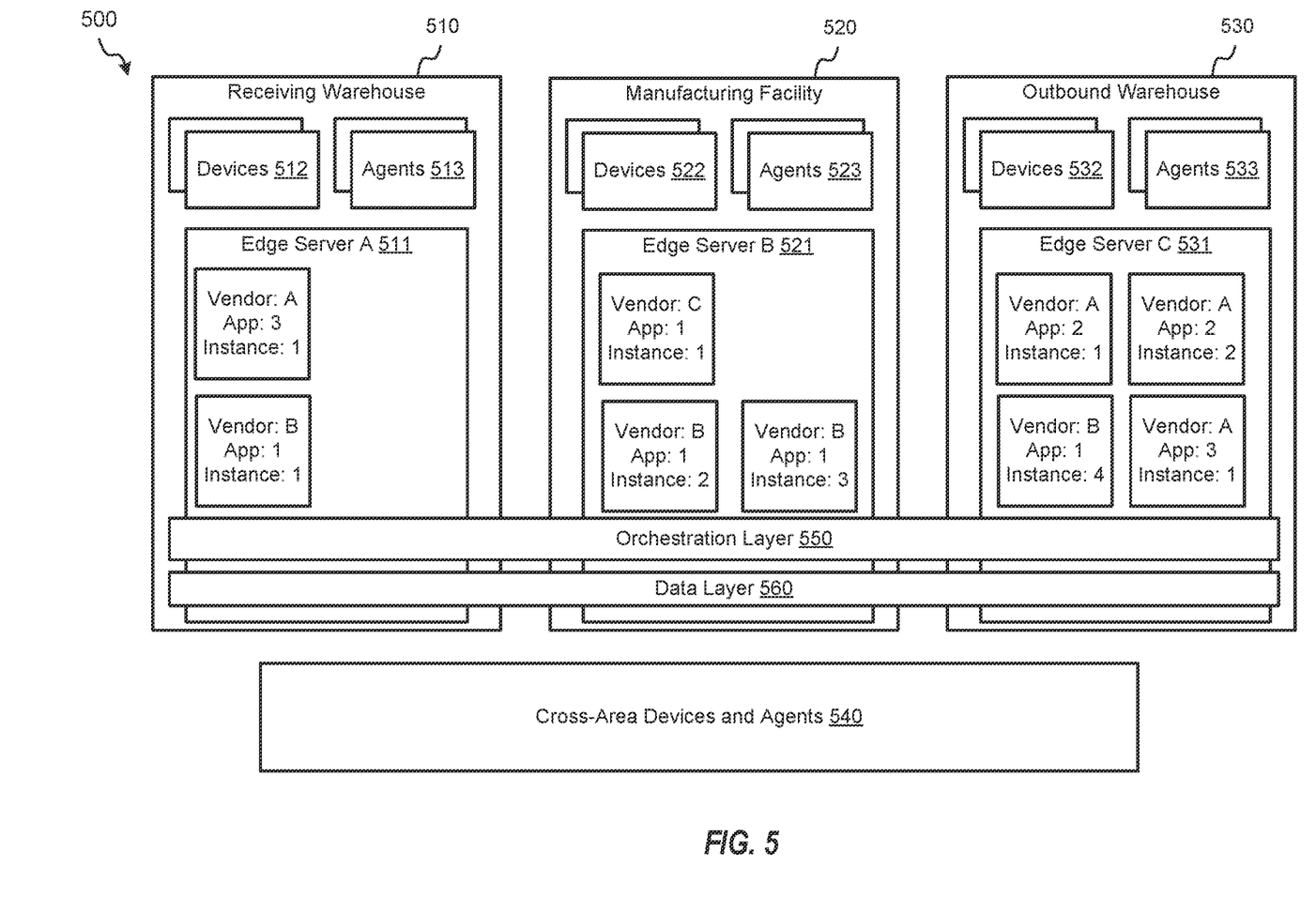
FIG. 5 is a block diagram illustrating an example of multi-tenancy functionality of an edge system.

FIG. 5 is a block diagram illustrating an operational example of an edge system implemented in accordance with the present disclosure. The particular operational environment of the example illustrated in FIG. 5 is a manufacturing environment, in which various devices are deployed to facilitate manufacturing. In this example, three facilities, which may be remote, are part of the manufacturing activities. For example, receiving warehouse 510 maybe a warehouse where materials and tools that are to be used in the manufacturing process may be received. Manufacturing facility 520 may be a facility in which products are manufactured, and outbound warehouse 530 may be a warehouse in which the manufactured products may be stored. In each facility, operations may involve use of multiple devices, such as sensors, robots, computers, etc.

In this operational example of an edge deployment, implementation of features of the present disclosure may allow the entire site (e.g., including the three facilities 510, 520, and 530) to be managed as a singular deployment and operation. Specifically, implementing a common data layer and a common orchestration layer across the three facilities allows any device or agent to operate across all three facilities. For example, receiving warehouse 510 may include devices 512 and agents 513 for performing operations in receiving warehouse 510. Similarly, manufacturing facility 520 may include devices 522 and agents 523 for performing operations in manufacturing facility 520, and outbound warehouse 530 may include devices 532 and agents 533 for performing operations in outbound warehouse 530. In aspects, system 500 may also include cross-area devices and agents 540. Cross-area devices and agents 540 may be configured to perform operations that overlap different facilities. For example, transportation robots may transport materials from receiving warehouse 510 to manufacturing facility 520 , or may transport products from manufacturing facility 520 to outbound warehouse 530. In some cases, cross-facility operation by the various edge devices of system 500 may include operations for services that are specific to a vendor or that spans multiple vendors.

In this example, in each facility, containerized components and applications from different vendors may operate in a single edge hub, across multiple edge servers, while keeping all components secure and isolated, and yet able to communicate with each other. For example, at receiving warehouse 510, which may include edge server A 511, two instances of applications may be deployed. In this case, instance 1 of application 3 of vendor A may be deployed to edge server A 511. The deployment of this application instance may be deployed to edge server A 511 based on the geographic characteristics of edge server A 511, namely that it is in receiving warehouse 510. Instance 1 of application 3 of vendor A may be providing a service to a device in receiving warehouse 510. As such, instance 1 of application 3 of vendor A may be deployed to edge server A 511 as it is near the edge device. In a similar manner, instance 1 of application 1 of vendor B may also be deployed to edge server A 511.

In some embodiments, a containerized application may be deployed on a plurality of servers. In some implementations, a same containerized application may be deployed on different servers. In some embodiments, multiple copies of the same containerized application may be deployed and run on the same server. In these cases, each "copy" of the containerized application may be referred to as an instance.

In this example, other instances of the same application may be deployed to edge servers located within the other facilities. For example, instances 2 and 3 of application 1 of vendor B may be deployed to edge server B 521 located in manufacturing facility 520, and instance 4 of application 1 of vendor B may be deployed to edge server C 531 located in outbound warehouse 530. In addition, instances of other applications may be deployed to the various servers. In these cases, the functionality of data layer 560 may enable the various application to communicate with other applications in other edge servers, or within the same edge server, as described above with respect to the discussion of the data layer. In addition, the security functionality provided by the implementation of namespaces ensures that applications are only able to communicate with authorized components. Furthermore, multi-tenancy features of edge system 500 as described herein provide further security, as resource access of the containers of the different applications is managed by application identity configuration, which may be verified using authentication.

Furthermore, the common orchestration layer 550 allows for scaling of the applications to meet load demands, or to load balance, across all three facilities. For example, at edge server C 531, three instances of application 2 of vendor A may be deployed to meet load demands, or in some cases to provide redundancy and fault-tolerance for critical services. In aspects, the various instances of the applications may be configured as private or public, which may provide further security controls of what components may access the services of those instances. In some aspects, different instances of the same application may have different modalities (e.g., public or private).

Figure 6:
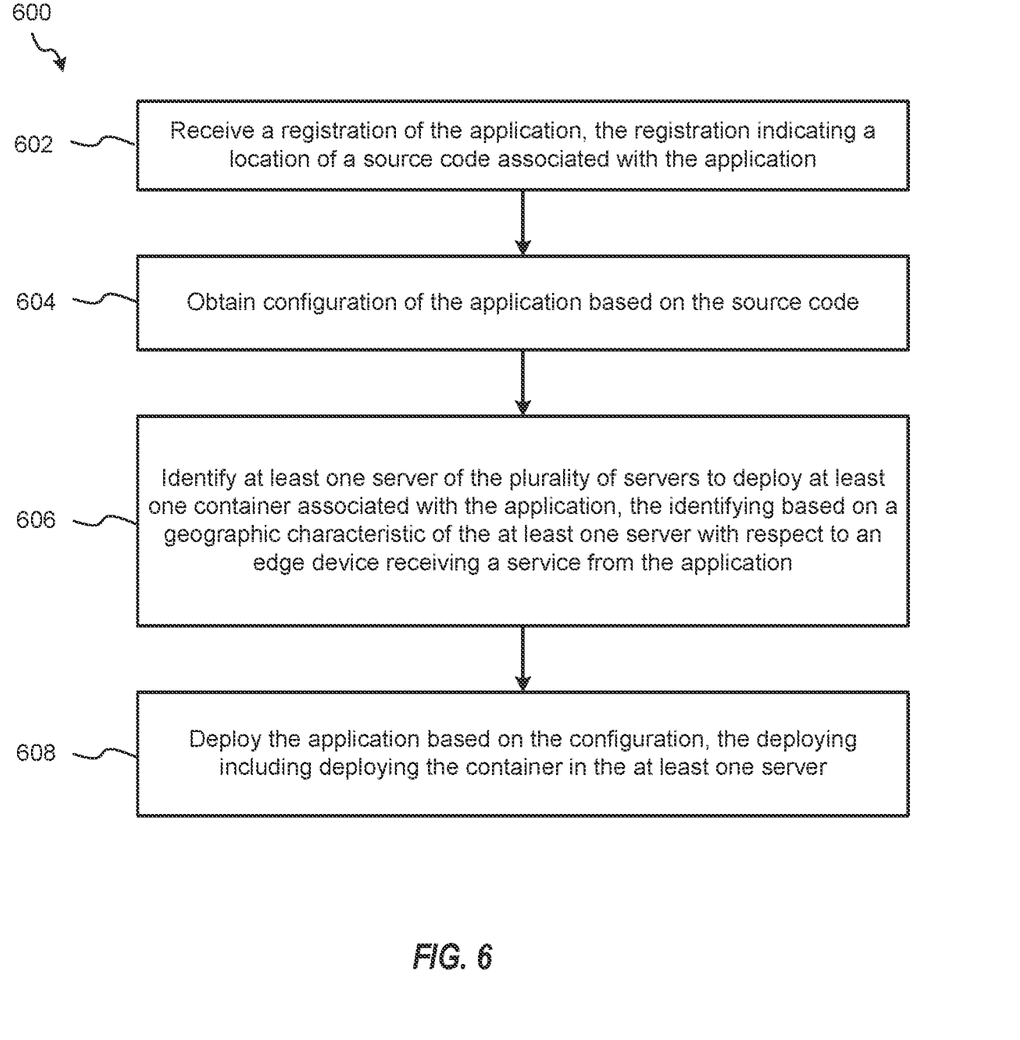
FIG. 6 is a flow diagram illustrating an example of a method for managing deployment of an application across a plurality of servers in an edge system according to one or more aspects.

Referring to FIG. 6, a flow diagram illustrating an example of a method for managing deployment of an application across a plurality of servers in an edge system according to one or more aspects is shown as a method 600. In some implementations, the operations of the method 600 may be stored as instructions that, when executed by one or more processors (e.g., the one or more processors of a monitoring device or a server), cause the one or more processors to perform the operations of the method 600. In some implementations, the method 600 may be performed by an edge hub, such as edge hub 102 of FIG. 1.

The method 600 includes receiving a registration of the application, the registration indicating a location of a source code and/or binaries associated with the application, at 602. For example, a vendor may register a service and may specify or indicate a location of a source code repository. In embodiments, the source code repository may store configuration data associated with the edge deployment, and/or configuration data associated with the application.

The method 600 includes obtaining configuration of the application based on the source code, at 604. At block 604, the method 600 includes identifying at least one server of the plurality of servers to deploy at least one container associated with the application. In aspects, identifying at least one server to deploy at least one container is based on a geographic characteristic of the at least one server with respect to an edge device receiving a service from the application. For example, it may be determined that the at least one edge server is near or in the same facility as devices associated with the application. In this case, deploying the container and/or the application on the edge server is advantageous as it is nearby.

The method 600 includes deploying the application based on the configuration, at 604. In aspects, deploying the application includes deploying the container in the at least one server, at 604. In aspects, a load on the at least one server is measured to determine whether the load exceeds a threshold. If the load is determined to exceed the threshold, at least one additional container associated with the application is deployed in the at least one server. In some aspects, the measurement includes one of the utilization of the container, or a number of messages in a message queue associated with the container.

The method 600 includes identifying at least one server of the plurality of servers to deploy at least one container associated with the application includes identifying a plurality of servers to deploy a plurality of containers associated with the application, at 606. The method 600 also includes deploying the application based on the configuration, the deploying including deploying the container in the at least one server, at 608. For example, the configuration of the application may indicate that multiple containers are to be deployed, or an edge hub (e.g., edge hub 102 of FIG. 1) may determine, based on device distribution and current load how many containers and where they are to be deployed.

In aspects, communication between the application and other applications of the edge system may be managed via a data layer, such as discussed above with respect to FIG. 1. In aspects, managing the communication between the application and the other applications may include sending messages, by the application, to the other applications directly through the data layer, or using at least one translation shim.

In aspects, the application may be configured with a public modality or a private modality. In aspects, the application may include built-in security though managed namespaces and multi-tenant authentication. In embodiments, multi-tenant authentication may include determining and/or confirming an identity associated with one or more applications, and then determining access to edge resource for the containers of the application based on the application.

Some further features that may be considered to provide further functionality may include additional use cases. For example, these additional use cases my include general environments. Functionality for general environments may include device support in the form of software updates, device registration and onboarding, and data schema affinity for multi-server environments. In another use case, such as in a hospital environment, further functionality may include configuring multi-tenant edge environment, and for a warehouse and manufacturing environment, further functionality may include task allocation across a fleet of robots, managing joint state of the system, which could involve items from multiple vendors, and read vs. write permissions for shared information.

Yet further features that may be considered to provide further functionality include additional considering proliferation of edge devices operated as-a-service, change management, versioning, version control between multiple vendors (with cloud updates) e.g., schema registry, etc. Further features may consider technical challenges, such as securing vendors with insecure protocols. For example, multiple industrial systems may be controlled or interfaced with over Modbus. In this case, if these systems are configured on the same network, a device may attempt to send malicious messages to another device/vendor. Another technical challenge to consider is considering the functionality of edge systems according to aspects of the present disclosure as-a-service model impacting dependent components and vendors. For example, for a picking application with a particular robot and vision system, the vision system could update its system remotely and change Modbus addresses without the robot knowing, which could cause potential catastrophic behavior. Yet another technical challenge may be improving robustness, security, and registration of devices to the edge hub, and edge to cloud encryption and robustness in addition to within edge connection. Still another technical challenge to consider is providing security during computation (e.g., SGX for secure enclaves).

It is noted that other types of devices and functionality may be provided according to aspects of the present disclosure and discussion of specific devices and functionality herein have been provided for purposes of illustration, rather than by way of limitation. It is noted that the operations of the method 600 of FIG. 6 may be performed in any order, or that operations of one method may be performed during performance of another method. It is also noted that the method 600 of FIG. 6 may also include other functionality or operations consistent with the description of the operations of the system 100 of FIG. 1.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Components, the functional blocks, and the modules described herein with respect to FIGS. 1-6) include processors, electronics devices, hardware devices, electronics components, logical circuits, memories, software codes, firmware codes, among other examples, or any combination thereof. In addition, features discussed herein may be implemented via specialized processor circuitry, via executable instructions, or combinations thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logics, logical blocks, modules, circuits, and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules, and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or any conventional processor, controller, microcontroller, or state machine. In some implementations, a processor may also be implemented as a combination of computing devices, such as a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or any combination thereof. Implementations of the subject matter described in this specification also may be implemented as one or more computer programs, that is one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that may be enabled to transfer a computer program from one place to another. A storage media may be any available media that may be accessed by a computer. By way of example, and not limitation, such computer-readable media can include random-access memory (RAM), read-only memory (ROM), electrically erasable programmable read-only memory (EEPROM), CD-ROM or other optical disk storage, magnetic disk storage or other magnetic storage devices, or any other medium that may be used to store desired program code in the form of instructions or data structures and that may be accessed by a computer. Also, any connection may be properly termed a computer-readable medium. Disk and disc, as used herein, includes compact disc (CD), laser disc, optical disc, digital versatile disc (DVD), floppy disk, hard disk, solid state disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to some other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of any device as implemented.

Certain features that are described in this specification in the context of separate implementations also may be implemented in combination in a single implementation. Conversely, various features that are described in the context of a single implementation also may be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted may be incorporated in the example processes that are schematically illustrated. For example, one or more additional operations may be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products. Additionally, some other implementations are within the scope of the following claims. In some cases, the actions recited in the claims may be performed in a different order and still achieve desirable results.

As used herein, including in the claims, various terminology is for the purpose of describing particular implementations only and is not intended to be limiting of implementations. For example, as used herein, an ordinal term (e.g., "first," "second," "third," etc.) used to modify an element, such as a structure, a component, an operation, etc., does not by itself indicate any priority or order of the element with respect to another element, but rather merely distinguishes the element from another element having a same name (but for use of the ordinal term). The term "coupled" is defined as connected, although not necessarily directly, and not necessarily mechanically; two items that are "coupled" may be unitary with each other. the term "or," when used in a list of two or more items, means that any one of the listed items may be employed by itself, or any combination of two or more of the listed items may be employed. For example, if a composition is described as containing components A, B, or C, the composition may contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (that is A and B and C) or any of these in any combination thereof. The term "substantially" is defined as largely but not necessarily wholly what is specified—and includes what is specified; e.g., substantially 90 degrees includes 90 degrees and substantially parallel includes parallel—as understood by a person of ordinary skill in the art. In any disclosed aspect, the term "substantially" may be substituted with "within [a percentage] of" what is specified, where the percentage includes 0.1, 1, 5, and 10 percent; and the term "approximately" may be substituted with "within 10 percent of" what is specified. The phrase "and/or" means and or.

Although the aspects of the present disclosure and their advantages have been described in detail, it should be understood that various changes, substitutions and alterations can be made herein without departing from the spirit of the disclosure as defined by the appended claims. Moreover, the scope of the present application is not intended to be limited to the particular implementations of the process, machine, manufacture, composition of matter, means, methods and processes described in the specification. As one of ordinary skill in the art will readily appreciate from the present disclosure, processes, machines, manufacture, compositions of matter, means, methods, or operations, presently existing or later to be developed that perform substantially the same function or achieve substantially the same result as the corresponding aspects described herein may be utilized according to the present disclosure. Accordingly, the appended claims are intended to include within their scope such processes, machines, manufacture, compositions of matter, means, methods, or operations.

What is claimed is:

1. A method for managing deployment of an application across a plurality of servers in an edge system, the method comprising:
    receiving, by a configuration manager running on at least one server of the edge system, a registration of the application, the registration indicating a location of an executable code associated with the application;
    obtaining, by the configuration manager, configuration of the application based on the executable code;
    identifying, by the configuration manager, at least one server of the plurality of servers to deploy at least one container associated with the application, the identifying based on a geographic characteristic of the at least one server with respect to an edge device receiving a service from the application; and
    deploying, by a container manager running on the at least one server of the edge system, the application based on the configuration, the deploying including deploying the container in the at least one server,
    wherein the application includes a plurality of applications, and wherein at least one application is associated with a first vendor, and at least one application is associated with a second vendor different from the first vendor, and wherein deploying the application based on the configuration includes deploying the at least one application associated with the first vendor to a first server in the edge system and the at least one application associated with the second vendor to a second server in the edge system, wherein the container manager is configured to deploy (i) at least one additional container associated with the application associated with the first vendor and (ii) at least one additional container associated with the application associated with the second vendor, to load balance across the first vendor and the second vendor.

2. The method of claim 1, further comprising:
    measuring a load on the at least one server;
    determining that the load exceeds a threshold; and
    determining to deploy at least one additional container associated with the application in the at least one server when the load is determined to exceed the threshold.

3. The method of claim 2, wherein the load is one of:
    utilization of the container; and
    a number of messages in a message queue associated with the container.

4. The method of claim 1, wherein identifying at least one server of the plurality of servers to deploy at least one container associated with the application includes identifying a plurality of servers to deploy a plurality of containers associated with the application.

5. The method of claim 4, further comprising:
    managing, via a data layer, communication between the application and another application of the edge system.

6. The method of claim 5, wherein managing the communication between the application and the another application includes sending messages, by the application, to the another application directly through the data layer.

7. The method of claim 5, wherein managing the communication between the application and the another application includes sending messages, by the application, to the another application using at least one translation shim.

8. The method of claim 5, wherein the another application is an application external to the edge system.

9. The method of claim 5, wherein the application is configured with one of:
    a public modality; and
    a private modality.

10. The method of claim 9, wherein in a private modality managing the communication between the application and the another application includes one or more of:
    denying access to the another application to messages from the application when the another application is associated with a different vendor from a vendor associated with the application; and
    enabling the application to share data with the another application via a private channel, wherein the data shared with the another application includes messages from the application.

11. The method of claim 9, wherein configuration of a modality for the application includes associating the container of the application with a namespace.

12. The method of claim 1, wherein the container is associated with a security group.

13. The method of claim 12, wherein resources access configuration associated with the container is based on the security group.

14. An edge system for managing deployment of an application across a plurality of servers in the edge system, the plurality of servers including at least one processor, the edge system comprising:
- a configuration manager running on at least one server of the edge system, wherein the at least one processor is programmed for executing the configuration manager that includes:
  - receiving a registration of the application, the registration indicating a location of an executable code associated with the application;
  - obtaining configuration of the application based on the executable code; and
  - identifying at least one server of the plurality of servers to deploy at least one container associated with the application, the identifying based on a geographic characteristic of the at least one server with respect to an edge device receiving a service from the application; and
- a container manager running on the at least one server of the edge system, wherein the at least one processor is programmed for executing the container manager that includes deploying the application based on the configuration, the deploying including deploying the container in the at least one server,
- wherein the application includes a plurality of applications, and wherein at least one application is associated with a first vendor, and at least one application is associated with a second vendor different from the first vendor, and wherein deploying the application based on the configuration includes deploying the at least one application associated with the first vendor to a first server in the edge system and the at least one application associated with the second vendor to a second server in the edge system, wherein the container manager is configured to deploy (i) at least one additional container associated with the application associated with the first vendor and (ii) at least one additional container associated with the application associated with the second vendor, to load balance across the first vendor and the second vendor.

15. The edge system of claim 14, further comprising:
- measuring a load on the at least one server;
- determining that the load exceeds a threshold; and
- determining to deploy at least one additional container associated with the application in the at least one server when the load is determined to exceed the threshold.

16. The edge system of claim 14, wherein managing communication between the application and another application of the edge system is facilitated via a data layer, wherein the application is associated with the first vendor and the another application is associated with the second vendor different from the first vendor, and wherein managing the communication between the application and the another application includes one or more of:
- sending messages, by the application, to the another application directly through the data layer;
- sending messages, by the application, to the another application using at least one translation shim when the another application is an application external to the edge system; or when in a private modality of the application, one of:
- denying access to the another application to messages from the application when the another application is associated with a different vendor from a vendor associated with the application; and
- enabling the application to share data with the another application via a private channel, wherein the data shared with the another application includes messages from the application.

17. A device for managing deployment of an application across a plurality of servers in an edge system, the device comprising:
- at least one processor; and
- a memory coupled to the at least one processor, wherein the at least one processor is configured to perform operations including:
  - receiving, by a configuration manager running on at least one server of the edge system, a registration of the application, the registration indicating a location of an executable code associated with the application;
  - obtaining, by the configuration manager, configuration of the application based on the executable code;
  - identifying, by the configuration manager, at least one server of the plurality of servers to deploy at least one container associated with the application, the identifying based on a geographic characteristic of the at least one server with respect to an edge device receiving a service from the application; and
  - deploying, by a container manager running on the at least one server of the edge system, the application based on the configuration, the deploying including deploying the container in the at least one server,
- wherein the application includes a plurality of applications, and wherein at least one application is associated with a first vendor, and at least one application is associated with a second vendor different from the first vendor, and wherein deploying the application based on the configuration includes deploying the at least one application associated with the first vendor to a first server in the edge system and the at least one application associated with the second vendor to a second server in the edge system, wherein the container manager is configured to deploy (i) at least one additional container associated with the application associated with the first vendor and (ii) at least one additional container associated with the application associated with the second vendor, to load balance across the first vendor and the second vendor.

18. The device of claim 17, wherein the operations further comprise:
- measuring a load on the at least one server;
- determining that the load exceeds a threshold; and
- determining to deploy at least one additional container associated with the application in the at least one server when the load is determined to exceed the threshold.

* * * * *